United States Patent [19]

Palmisano et al.

[11] 4,384,660

[45] May 24, 1983

[54] TAMPER-PROOF CLIP FOR UPLOCKING PLUNGERS OF PUMP DISPENSERS

[75] Inventors: John J. Palmisano, Gladstone; Donald D. Foster, Kingsville; Robert N. Hills, Raytown, all of Mo.

[73] Assignee: Realex Corporation, Kansas City, Mo.

[21] Appl. No.: 287,241

[22] Filed: Jul. 27, 1981

[51] Int. Cl.$^{3}$ .......................... B67D 5/32; F16K 35/00

[52] U.S. Cl. .................................... 222/153; 222/384; 24/256; 92/23

[58] Field of Search .................... 222/153, 384, 402.11; 215/274–275, 221, 250, 253; 220/319–320; 251/90, 93; 92/23; 24/16 PB, 17 AP, 256, 257; 239/71

[56] References Cited

U.S. PATENT DOCUMENTS 1,260,501 3/1918 Wise .................................... 222/153
2,851,184 9/1958 Strode ................................. 215/250
3,422,996 1/1969 Lipman .......................... 222/402.11
3,654,049 4/1972 Ausnit ............................... 24/16 PB
4,318,498 3/1982 Malers et al. ....................... 222/153

FOREIGN PATENT DOCUMENTS 694678 9/1964 Canada ................................ 222/153
376328 3/1964 Switzerland ....................... 24/16 PB

*Primary Examiner*—Charles A. Marmor
*Attorney, Agent, or Firm*—Schmidt, Johnson, Hovey & Williams

[57] ABSTRACT

A one-time use, disposable, plastic-molded locking clip is provided for retaining the depressible plunger of a dispensing pump in a fully extended position during shipment or otherwise. The clip may be snapped onto the plunger after the latter has been fully assembled, yet once installed, the snapped together portions of the clip are not readily detectable nor accessible so that the clip may not be removed without destroying the same by tearing a twist tab therefrom. The generally C-shaped jaws of the clip embrace the plunger immediately below the head thereof in order to block depression, and such jaws forceably interlock with each other into a complete loop so that the clip may be installed upon pumps devoid of structure which would assist in locking the clip in place. Mating hooks of the interlocking components on the jaws are so oriented that the resistive force from the plunger tending to spread apart the embracing jaws of the clip simply tends to tighten the interengagement of the hooks as the jaws pull against each other at their outer ends.

18 Claims, 7 Drawing Figures

TAMPER-PROOF CLIP FOR UPLOCKING PLUNGERS OF PUMP DISPENSERS

TECHNICAL FIELD

This invention relates to fluid dispensing pumps and, more particularly, to an improved, disposable clip which may be factory-installed in order to prevent accidental depression of the plunger of such a pump during shipment or display on retailers' shelves. Furthermore, the invention relates to such a clip which may be removed only by tearing it apart, thereby providing an immediate and accurate indication to the retailer that the product has been tampered with and enabling him to take appropriate action such as removing the item from the shelf before purchased by an unsuspecting customer.

BACKGROUND ART

Reference is hereby made to prior pending application Ser. No. 06/164,306 filed June 30, 1980 in the names of James T. Workman, et al. relating to a tamper-resistant locking clip for dispensing pumps. The present invention comprises an improvement over the teachings of that application.

The clip of said prior application is intended for use primarily in conjunction with an additional, permanent lock of the type shown in U.S. Pat. No. 3,590,691, Wallace F. Magers, titled "Locking Clip for Hand Pumps". Although permanently installed, the lock of that particular patent may be selectively rotated by the user into either locking or nonlocking positions. The concepts of the aforementioned Workman, et al. application involve utilizing the structure of a permanent lock such as set forth in U.S. Pat. No. 3,590,691 as a means of attachment for the temporary Workman, et al. clip to the pump. Thus, the Workman, et al. clip includes a pair of separate arms, each generally C-shaped and having a hook at its outermost end which snaps into a suitable recess on structure such as the U.S. Pat. No. 3,590,691 lock, and it is through this type of connection that the Workman, et al. clip is held onto the dispensing pump during shipment and shelf storage.

While the Workman, et al. clip has proven to be quite satisfactory, there are times when it is desirable to utilize a disposable, tamper-proof locking clip on pumps which are devoid of structure relied upon by the Workman, et al. clip. Furthermore, the need has arisen for providing a clip of the subject type which is even more reliable than the Workman, et al. clip in the sense that it is even less likely to acccidentally dislodge from the plunger during the severe loading forces to which such plungers are often subjected when their containers are upended and violently shaken or jarred during shipment and other handling.

SUMMARY OF THE PRESENT INVENTION

Accordingly, the present invention provides a disposable, one-time use locking clip having plunger-embracing jaws that forceably snap into interlocking engagement with one another when installed on the pump so as to pull directly against each other in resisting attempted plunger depression, thereby providing such a high degree of interlocking fit that accidental dislodgment of the clip from the pump is held to a minimum. As in the prior Workman, et al. clip, a gripping tab having a destructable connection with the jaws may be torn from the jaws in a twisting motion, and the interlocking hooks of the jaws are themselves fully concealed and rendered unaccessible once the clip is installed such that destruction of the clip through the twist tab is substantially the only way in which the clip can be removed from the pump.

DETAILED DESCRIPTION

Figure 1:
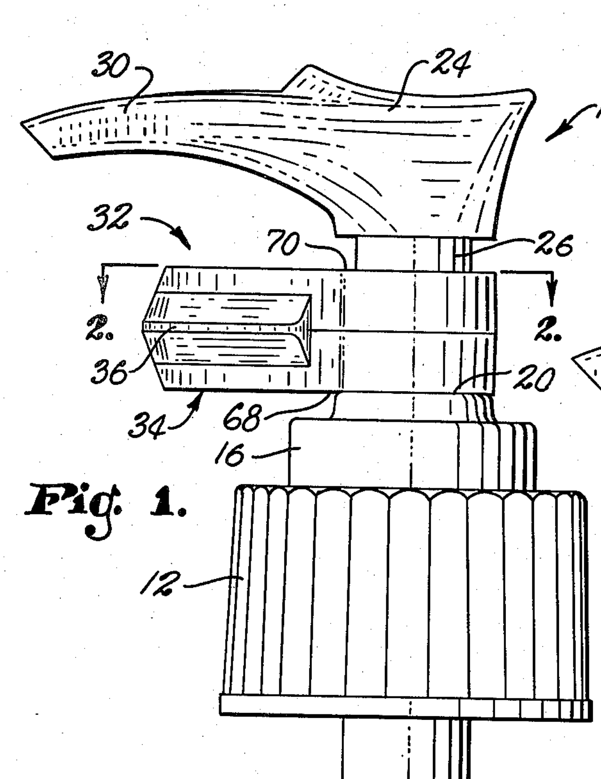
FIG. 1 is a fragmentary side elevational view of a dispensing pump having one form of locking clip in accordance with the present invention installed thereon.
Figure 3:
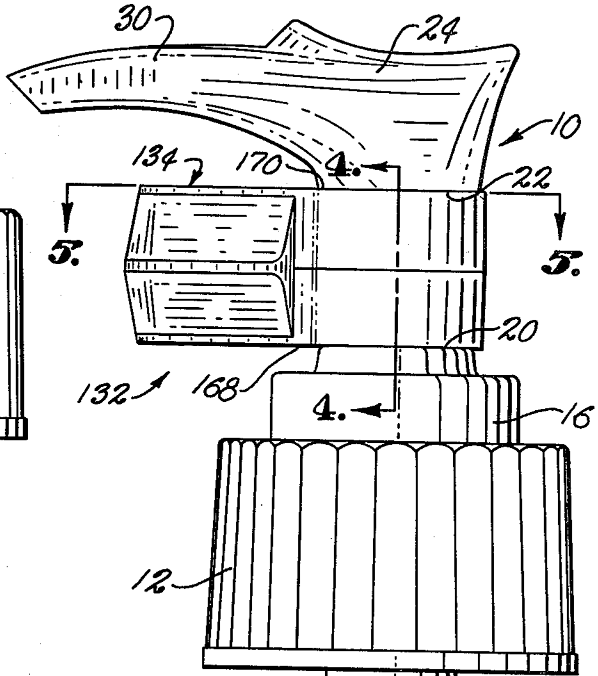
FIG. 3 is a view similar to FIG. 1 of a dispensing pump but employing a second form of the present invention.
Figure 4:
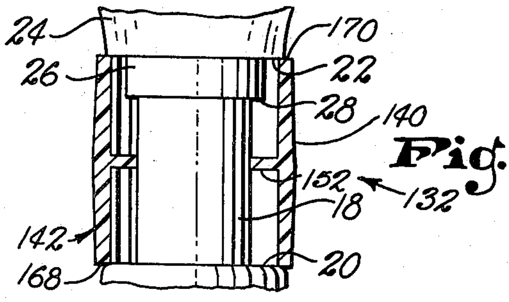
FIG. 4 is a fragmentary cross-sectional view thereof taken substantially along line 4—4 of FIG. 3.

The pump 10 of FIG. 1 is utilized with a closure cap 12 that is internally threaded in order to adapt the pump 10 for installation onto the externally threaded neck of a suitable container (not shown) in such a position that the dip tube 14 will project down into the contents of the container. A collar 16 of the pump 10 attaches to the closure cap 12 in order to secure the pump 10 onto the latter, and the collar 16 has a central aperature (not shown) through which the plunger 18 (FIG. 4) reciprocates. An upper surface 20 on the collar 16 defines an abutment spaced below a downwardly facing shoulder 22 on the dispensing head 24 at the outer end of plunger 18, and a boss 26 immediately below the head 24 likewise presents a downwardly facing shoulder 28 (FIG. 4) in spaced opposition to the abutment defined by the upper surface 20 of the collar 16. As is well understood by those skilled in the art, depression of the plunger 18 by the head 24 when the pump assembly 10 is installed upon a container having liquid therein will result in liquid being pumped up the dip tube 14 and out the spout 30 of the head 24.

Figure 2:
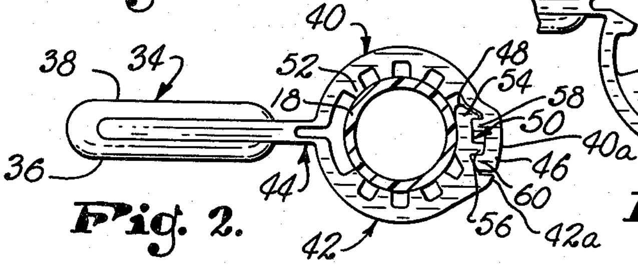
FIG. 2 is a transverse cross-sectional view of the clip and pump taken substantially along line 2—2 of FIG. 1.

The clip 32 of FIGS. 1 and 2 is quite similar to the clip 132 of FIGS. 3, 4, 5 and 6 hereafter described in detail. The difference between the two clips 32 and 132 resides primarily in the fact that the clip 32 utilizes the shoulder 28 of boss 26 as a means for blocking depression of the plunger 18, whereas the clip 132 utilizes the shoulder 22 of the head 24 for such blocking purposes. In all other meaningful respects, the clips 32 and 132 are closely similar.

The clip 32 is preferably an integral, one-piece article molded from a suitable synthetic resinous material. It includes a grip tab 34 having generally flat, opposite sides 36 and 38 that are easily gripped between the thumb and index finger of the user.

Figure 6:
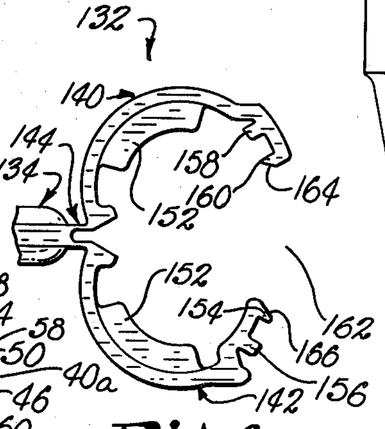
FIG. 6 is a fragmentary plan view of the clip of FIGS. 3-5 illustrating the manner in which the jaws thereof are normally held open and spread apart prior to installation of the clip upon the pump.
Figure 5:
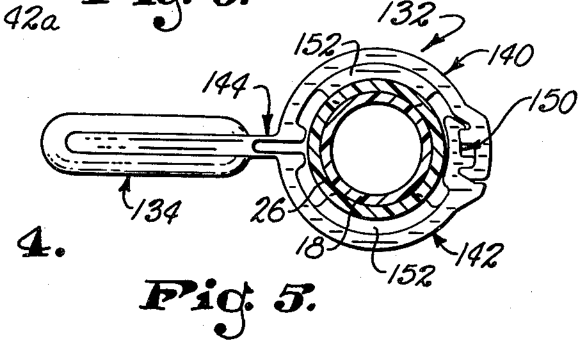
FIG. 5 is a transverse cross-sectional view thereof taken substantially along line 5—5 of FIG. 3.

A pair of opposite, generally C-shaped jaws 40 and 42 are integrally connected to the tab 34 via a destructable hinge connection 44 that permits each of the jaws 40,42 to be pressed inwardly from an initial widespread position as shown in FIG. 6 to a closed position in FIGS. 2 and 5 in which the outer ends 46 and 48 of the jaws 40 and 42 respectively overlap one another to present a closed loop. Interlocking means broadly denoted by the numeral 50 adjacent the outer ends 46 and 48 serve to directly lock such outer ends to one another and to maintain the jaws 40,42 in their closed loop configuration.

As noted in FIG. 2, when the clip 32 is installed, the jaws 40 and 42 embrace or encircle the plunger 18, and radially inwardly directed projections 52 on the interior surfaces of the jaws 40,42 make forceful, abutting engagement with the exterior of the plunger 18. Thus, the jaws 40 and 42 are under tension loading as they pull against one another through the interlocking means 50. It is further to be noted that the interlocking means 50 is almost totally hidden from view when the clip 32 is installed inasmuch as the locking means 50 is located interiorly of the overlapping portions of the jaws 40 and 42 adjacent said ends 46 and 48 thereof. In this regard, radially outwardly projecting hooks 54 and 56 on a radially outer surface of the jaw 42 mate with radially inwardly directed hooks 58 and 60 respectively on the radially inward surface of the jaw 40 with the result that such juxtaposed components are not visible without careful, close scrutiny. Moreover, it is to be noted that the outer surface 40*a* of jaw 40 is substantially flush with the outer surface 42*a* of jaw 42 at the point where overlap of the two jaws begins, thereby rendering the hooks 54–60 virtually totally inaccessible once snapped in place.

With reference now to FIG. 6, it is contemplated that the condition of the clip 132 illustrated therein will substantially correspond to the condition of clips 32 and 132 when received from the mold. To install clip 132, it is but necessary to grasp the tab 134 and approach the plunger 18 with the latter aligned with the space 162 defined between the opened jaws 140 and 142. When the plunger 18 is fully received within the interior of the jaws 140,142, light pinching pressure on the outside surfaces of the jaws 140,142 will cause the same to flex inwardly about the destructable hinge 144 and close about the plunger 18. As such closure continues, endmost cam faces 164 and 166 on the jaws 140 and 142 respectively are caused to come into abutting engagement with one another, such faces 164 and 166 being beveled in such a direction that as the closing movement progresses, the jaw 140 is caused to slip radially outwardly a sufficient extent to enable hook 160 thereof to pass over and slip behind the hook 154 of jaw 142. Still further continued closing movement of the jaws 140 and 142 causes the cam face 164 to engage and ultimately slip up and over the hook 156 of jaw 142 while, likewise, the cam face 166 of hook 154 bears against and slips up and over the hook 158 of jaw 140. Thus, the jaws 140 and 142 come into a double hooked arrangement as illustrated clearly in FIG. 5 and in FIG. 2. As in the clip 32, the interlocking means 150 of the clip 132 is thereby securely interengaged and rendered not only undetectable but also unaccessible.

As in the case of the clip 32, the clip 132 is provided with radially inwardly extending projection means which forceably engage the smooth exterior of the plunger 18. Whereas the clip 32 utilizes a circumferentially extending series of individual projections 52, the clip 132 uses a single blade or rib 152 on each jaw 140 or 142.

As can be well appreciated, the clips 32 and 132 thus provide a secure means of locking the plunger 18 in a fully extended position. While in the case of the clip 32, its lower edge 68 bears against the abutment surface 20 and its upper edge 70 bears oppositely against the shoulder 28, and in the clip 132, its lower edge 168 bears against the abutment surface 20 and its upper edge 170 bears against the shoulder 22, in both cases the clips 32 and 132 prevent depression of the plunger 18. Likewise, in both cases the means by which the clips are snapped onto the plunger 18 is unaccessible and hidden from view, thereby decreasing the likelihood that curious shoppers will sample the contents of the container with which the pump 10 is associated. This is particularly the case when it is considered that the clips 32 and 132 must be literally destroyed by twisting off the tabs 34 and 134 along the weak hinges 44 and 144 respectively in order to release the clips from the pump.

Figure 7:
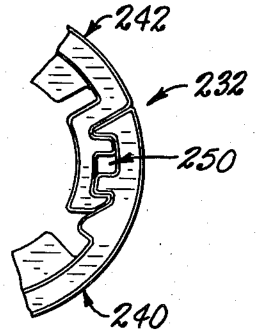
FIG. 7 is an enlarged fragmentary plan view of another embodiment of the present invention illustrating a construction whereby the outer periphery of the clip may be of one continuous diameter in order to inhibit access to the interlocking portions of the jaws.

The construction illustrated in FIG. 7 of the clip 232 is identical functionally to the clip of FIGS. 3–5 and 6. However, it differs structurally in that the interlocking and overlapping portions of the jaws 240 and 242 have been so arranged that when such portions are interengaged in a locking mode, the outer periphery of the clip is continuously smooth, even in the area of the overlap and interlock, whereby to more fully inhibit unauthorized access to the interlocking means 250.

We claim:

1. In combination with a dispensing pump having a depressible plunger shiftable through an apertured abutment and provided with a shoulder adjacent its outer end, a one-time, disposable locking clip blocking depression of the plunger, said clip comprising:

a grip tab;

a pair of opposite, generally C-shaped jaws connected to said tab and embracing said plunger between the shoulder and the abutment;

interlocking means on said jaws directly connecting an outer end of one of the jaws to an outer end of the other of said jaws in order to lock the jaws in a closed loop and prevent spreading release thereof from the plunger; and destructable means effecting said connection of the jaws with said tab adjacent the opposite inner ends of the jaws in a manner to permit the tab to be manually torn from the jaws to release the clip from the plunger.

2. In the combination as claimed in claim 1, wherein said jaws are provided with structure adjacent said outer ends thereof blocking access to said interlocking means.

3. In the combination as claimed in claim 2, wherein said structure includes overlapping portions of said jaws presenting juxtaposed, radially inwardly and outwardly facing surfaces, said interlocking means including mating components on said surfaces.

4. In the combination as claimed in claim 3, wherein said components include radially inwardly projecting hook means on one of said jaw portions and radially outwardly projecting hook means on the other of said jaw portions.

5. In the combination as claimed in claim 4, wherein said hook means on each of said portions includes a pair of hooks spaced apart circumferentially with respect to the loop formed by the interconnected jaws, the hook nearest the end of said one portion being engageable with the hook more remote from the end of said other portion, and the hook nearest the end of said other portion being engageable with the hook more remote from the end of said one portion to provide a double locking arrangement.

6. In the combination as claimed in claim 3, wherein said portions are provided with endmost cam faces disposed for camming interengagement when the jaws close about the plunger from an open spread apart position during installation of the clip, said faces being disposed to cooperatively cam said portions into said overlapping relationship.

7. In the combination as claimed in claim 3, wherein said overlapping portions have radially outer surfaces substantially flush with one another at the endmost extreme of one of said portions corresponding to the initial point of said overlap.

8. In the combination as claimed in claim 1, wherein said jaws are provided with radially inwardly disposed projections forceably engaging said plunger whereby to cause said jaws to pull against one another through said interlocking means, tending to maintain the latter interlocked.

9. In the combination as claimed in claim 1, wherein said plunger has a manually engageable dispensing head at said outer end by which the plunger may be depressed, said shoulder being on the underside of said head.

10. In the combination as claimed in claim 1, wherein said plunger has a manually engageable dispensing head at said outer end by which the plunger may be depressed, said plunger further having a boss positioned below said head and having an underside presenting said shoulder.

11. A one-time, disposable locking clip for use in temporarily blocking depression of the plunger of a dispensing pump, said clip comprising:

a grip tab;

a pair of opposite, generally C-shaped jaws connected to said tab and closable about said plunger into a complete loop when installed between a shoulder on the plunger and an opposed abutment on a stationary portion of the pump;

interlockable means on said jaws for directly connecting an outer end of one of said jaws to an outer end of the other of said jaws when said jaws are formed into said loop about the plunger; and destructable means effecting said connection of the jaws with said tab adjacent the opposite inner ends of the jaws in a manner to permit the tab to be manually torn from the jaws to release the clip from the plunger.

12. A locking clip as claimed in claim 11, wherein said jaws are provided with structure adjacent said outer ends thereof blocking access to said interlocking means.

13. A locking clip as claimed in claim 12, wherein said structure includes overlapping portions of said jaws presenting juxtaposed, radially inwardly and outwardly facing surfaces, said interlocking means including mating components on said surfaces.

14. A locking clip as claimed in claim 13, wherein said components include radially inwardly projecting hook means on one of said jaw portions and radially outwardly projecting hook means on the other of said jaw portions.

15. A locking clip as claimed in claim 14, wherein said hook means on each of said portions includes a pair of hooks spaced apart circumferentially with respect to the loop formed by the interconnected jaws, the hook nearest the end of said one portion being engageable with the hook more remote from the end of said other portion, and the hook nearest the end of said other portion being engageable with the hook more remote from the end of said one portion to provide a double locking arrangement.

16. A locking clip as claimed in claim 13, wherein said portions are provided with endmost cam faces disposed for camming interengagement when the jaws close about the plunger from an open spaced apart position during installation of the clip, said faces being disposed to cooperatively cam said portions into said overlapping relationship.

17. A locking clip as claimed in claim 13, wherein said overlapping portions have radially outer surfaces substantially flush with one another at the endmost extreme of one of said portions corresponding to the initial point of said overlap.

18. A locking clip as claimed in claim 11, wherein said jaws are provided with radially inwardly disposed projections forceably engaging said plunger whereby to cause said jaws to pull against one another through said interlocking means, tending to maintain the latter interlocked.

* * * * *